Patented July 28, 1942

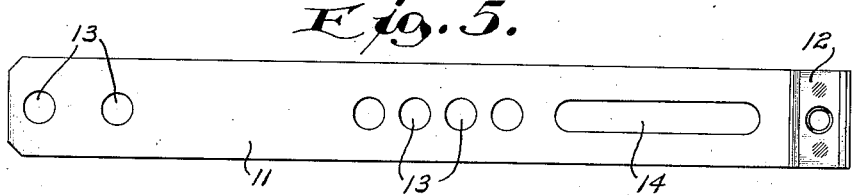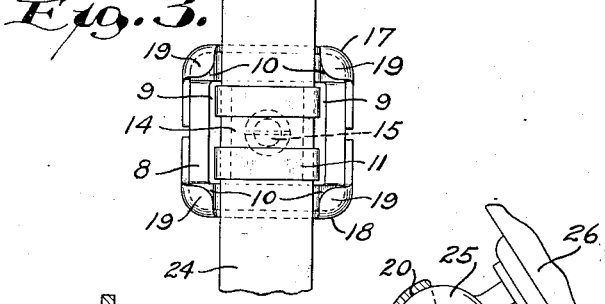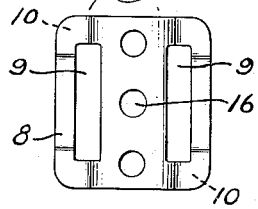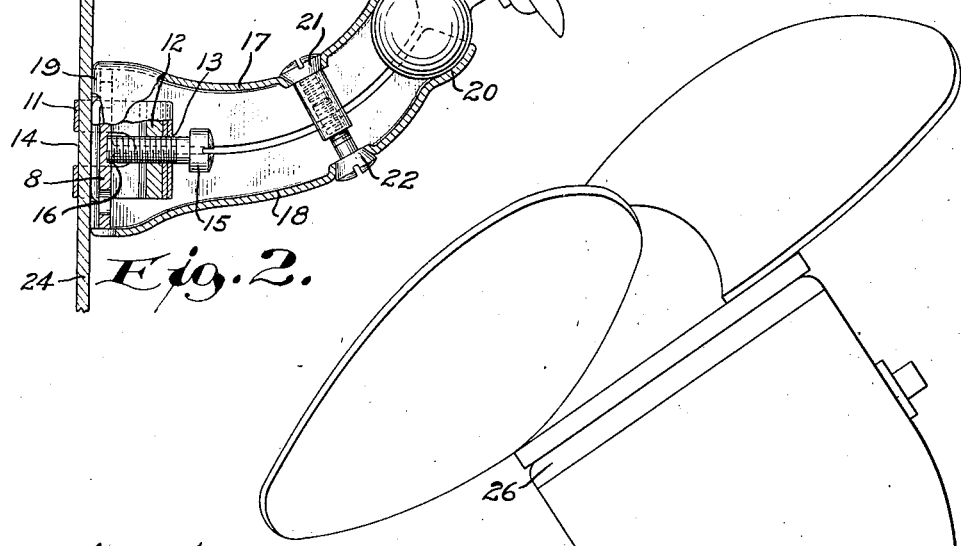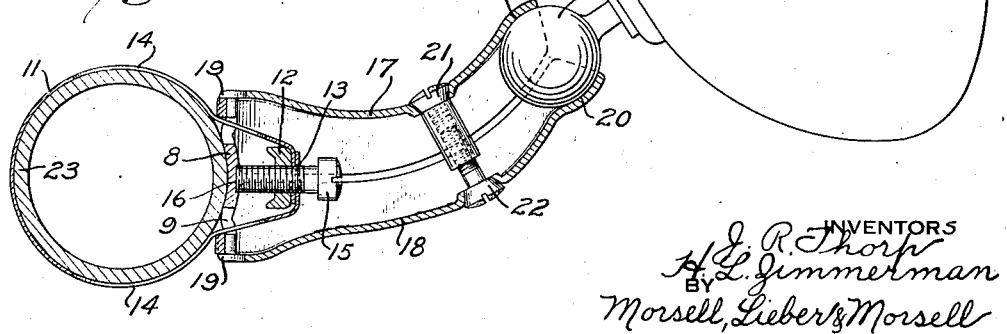

2,291,119

UNITED STATES PATENT OFFICE 2,291,119

ADJUSTABLE MOUNTING

Joel R. Thorp, West Allis, and Herbert L. Zimmerman, Shorewood, Wis., assignors to The Fulton Company, West Allis, Wis., a corporation of Wisconsin Application September 13, 1940, Serial No. 357,288

6 Claims. (Cl. 248—276)

Our invention relates in general to improvements in the art of attaching diverse objects to supporting structures of various types, and relates more specifically to improvements in the construction of adjustable mountings for effecting attachment of accessories such as electric fans, to various portions of a vehicle such as the steering column, windshield or window frames.

An object of our invention is to provide an improved adjustable mounting for fans or the like, which is simple in construction and efficient in use.

Manufacturers of accessories for vehicles such as automobiles, launches and airplanes, are constantly confronted with the problem of conveniently and rigidly attaching devices of different kinds to different portions of the vehicle assemblage in different selected positions. For example, one purchaser of an electric fan may prefer to have the same mounted upon the steering column, another may desire a mounting somewhere upon or near the windshield, whereas still others may want the fan suspended from one of the sides or from the rear window frame. While such vehicles are usually provided with clamping and finishing strips at various portions of the body, which are normally held in place by means of screws so as to make it possible to readily remove the strips, it is necessary because of vibration and possible jarring, to provide attaching means which will firmly clamp the supporting structure without undesirably marring the vehicle, and which may also be readily adjusted so as to suspend the fan or other object in the desired position. Any support which may be provided for such purposes, must also be readily installable by a novice, and all known prevous supportng and attachng structures have ether been too complicated, insufficiently durable, or too costly for general use.

It is therefore a more specific object of the present invention to provide an improved mounting assemblage for vehicle accessories or the like, which is simple and durable in construction, and which may be quickly and effectively applied to various types of supports.

Another specific object of our invention is to provide a universally adjustable mounting for automobile accessories such as fans, whereby the accessories may be firmly but adjustably suspended from various parts of the vehicle framework or body.

Still another specific object of this invention is to provide improved mechanism for adjustably supporting diverse devices so that the latter may be universally frictionally adjusted to assume any desired position, and which may be readily attached to various forms of supports by a novice.

A further specific object of the invention is to provide a new and useful mounting for various kinds of objects, which is attractive in appearance, which provides a vibration resistant support, and which can be sold at moderate cost.

These and other specific objects and advantages of the invention will be apparent from the following detailed description.

A clear conception of the features constituting our improvement, and of the mode of constructing and of utilizing adjustable mountings built in accordance with the invention, may be had by referring to the drawing accompanying and forming a part of this specification wherein like reference characters designate the same or similar parts in the various views.

Fig. 1 is a central section through one of the improved adjustable mountings, showing the same applied to a circular column or post and providing a support for an electric fan;

Fig. 2 is a similar section through one of the improved adjustable mountings, showing the same applied to a flat bar or strip of metal and also providing a support for an accessory such as a fan;

Fig. 3 is a rear view of the assemblage shown in Fig. 2;

Fig. 4 is a front or plan view of the base or clamping plate of the mounting; and Fig. 5 is a plan view of the flexible clamping strip constituting a part of the mounting assemblage.

While the improved adjustable mounting has been shown herein only as applied to circular and flat supports, and as providing a universal mounting for a fan, it is not our desire or intention to thereby unnecessarily restrict the scope or utility of the improvement, which may and has been utilized for other specific purposes.

Referring to the drawing, the improved adjustable mounting shown therein, comprises in general an approximately square or otherwise polygonal relatively flat base plate 8 having a pair of substantially parallel slots 9 therein, and also having corner abutments 10 at all of the corners thereof; a flexible metal clamping band 11 of suitable length having one end provided with a rigidly attached screw threaded block 12, and its opposite end portion provided with a series of openings 13, while the medial portion thereof is pierced by one or more elongated slots 14; a clamping element or screw 15 adapted to coact with the screw threads of the block 12 and with a selected opening 13 of the band 11 when the band ends have been inserted through the slots 9 and caused to overlap, and also being cooperable with a central socket 16 formed in the base plate 8; a pair of half-brackets or bracket sections 17, 18 each having a set of hooks 19 at one end interchangeably cooperable with a selected set of the base plate abutments 10, and also having a semispherical clamping socket 20 at its opposite end; and a cooperating set of screw threaded clamping elements 21, 22 coacting with the medial portions of the bracket sections 17, 18.

The base plate 8, clamping band 11, and bracket sections 17, 18 may all be formed of sheet metal with the aid of punches and dies, and the plate 8 may be slightly dished and perforated as shown so as to fit supports of various shapes. As shown in Fig. 1, the base plate 8 coacts with a cylindrical column or post 23 which may be the steering column of a vehicle; while in Figs. 2 and 3, the clamping plate 8 has been caused to coact with a flat bar or strip 24 which may be the finishing strip between the two sections of a vehicle windshield, or the bounding strip of a side or rear vehicle window, these strips normally being held in place by releasable screws. The clamping band 11 may be of any desired length and width depending upon its ultimate use, and the slots 14 augment the flexibility of this band 11 while the openings 13 permit its use on supports 23, 24 of different sizes and shapes. The threaded block 12 may be welded or otherwise secured to the end of the band 11, and the clamping screw 15 may be of standard construction. The bracket sections 17, 18 are dished so as to provide a housing which normally completely conceals the clamping screw 15 and the overlapped ends of the band 11, and these bracket sections 17, 18 have the hooks 19 thereon so formed, that the sections may be disposed in four different positions about the base plate 8. As shown, the semi-spherical sockets 20 of the cooperating bracket sections 17, 18 frictionally engage a sphere or ball 25 which provides a direct support for an electric fan 26, but the sockets 20 need not be spherical. The clamping elements 21, 22 besides retaining the hooks 19 in engagement with the abutments 10, also cause the sockets 20 to frictionally clamp the ball 25, so that the fan 26 is universally adjustable and remain in the desired position of adjustment.

During normal use of the improved adjustable mounting, and when it becomes desirable to assemble the parts thereof, the clamping strip 11 may first be placed about a fixed support, either a post 23 as shown in Fig. 1, or a strip 24 as shown in Fig. 2, and after the ends of the strip have been inserted through the slots 9 of the base plate 8 and have been caused to overlap, the clamping screw 15 may be applied as shown in Figs. 1 or 2. The excess metal at the end of the clamping strip 11 may be broken off so as to avoid obstruction to subsequent assembly of the bracket. When the plate 8 has been properly positioned with respect to the permanent support, the bracket sections 17, 18 may be assembled in the desired position with the hooks 19 thereof engaging the abutments 10 of the plate 8. The adjustable ball 25 with the accessory associated therewith, may then be inserted within the sockets 20, after which the threaded elements 21, 22 may be brought into coaction with each other so as to firmly clamp the bracket sections 17, 18 into position. The resiliency of the brackets 17, 18 will cause the sockets 20 to resiliently engage the ball 25 so as to permit universal adjustment of the fan 26 or other accessory which is carried by the ball, and the bracket sections 17, 18 when assembled, obviously provide an enclosure for the screw 15 and the ends of the band 11, and present a neat appearance.

It is to be noted that when the screw 15 is driven home to clamping position, the edges of the slots 9 in the base plate 8 kink the band 11 and cause the same to snugly embrace the fixed support. The socket 16 with which the end of the clamping screw 15 coacts, prevents possible slippage and undesirable displacement of the screw, and the threaded block 12 and opening 13 which are associated with the overlapping ends of the band 11, will permit extremely firm and rigid attachment of the plate 8 to a support. The slots 14 in the band 11 besides making this band more flexible, also provide spaced contact areas between the band and the fixed support, and the band 11 is sufficiently thin and has sufficient flexibility so that it may be readily applied in limited space. The ball 25 or other accessory support, is freely rotatable within the confining sockets 20, but cannot be removed therefrom without releasing the elements 21, 22, and this ball 25 may obviously be replaced by other types of rotary supports.

From the foregoing detailed description it will be apparent that our invention provides an improved adjustable mounting adapted for diverse uses, which is extremely simple and compact in construction, and which is moreover readily applicable to fixed supports of various types. The assemblage can be applied to a fixed support with little effort and without the use of tools other than a screw driver, and when the bracket sections have been properly positioned and clamped, the accessory will be readily adjustable and will be maintained in adjusted position even where the mounting is subjected to considerable vibration. The entire assemblage may be manufactured and sold at moderate cost, has neat appearance, and has proven highly successful in actual commercial use, especially for the purpose of supporting vehicle accessories.

It should be understood that it is not desired to limit this invention to the exact details of construction or to the precise mode of use, herein shown and described, for various modifications within the scope of the claims may occur to persons skilled in the art.

We claim:

1. In combination, a plate having a pair of parallel slots therein and corner abutments adjacent to the ends of said slots, a flexible metal band forming a clamping loop on one side of said plate and having its ends projected through said slots and overlapped on the opposite side of the plate, adjustable means coacting with said band ends and with said plate for varying the size of said loop, a pair of cooperating bracket sections coacting with said abutments and with each other to form a housing, and means for urging said sections toward each other to enclose said band ends and said adjustable means within the housing.

2. In combination, a plate having a pair of parallel slots therein and corner abutments adjacent to the ends of said slots, a flexible metal band forming a clamping loop on one side of said plate and having its ends projected through said slots and overlapped on the opposite side of the plate, an adjusting screw coacting with said band ends and with said plate between said slots for varying the size of said loop, a pair of bracket sections having corner hooks cooperable with said abutments and with each other to form a housing, and a clamping screw for uniting said sections to enclose said band ends and said adjusting screw within the housing.

3. In combination, an approximately square plate having parallel marginal slots and corner abutments, a flexible metal band forming a clamping loop on one side of said plate and having its opposite ends projected through said slots and overlapped on the opposite side of said plate, a set screw coacting with said band ends and with said plate for varying the size of said loop, a pair of bracket sections having corner hooks at one end engageable with said abutments and having their opposite ends provided with complementary sockets, and means for urging said sections toward each other.

4. In combination, an approximately square plate having parallel marginal slots and corner abutments, a flexible metal band forming a clamping loop on one side of said plate and having its opposite ends projected through said slots and overlapped on the opposite side of said plate, a set screw coacting with said band ends and with said plate for varying the size of said loop, a pair of bracket sections having corner hooks at one end engageable with said abutments and having their opposite ends provided with complementary sockets, a ball coacting with said sockets, and means for urging said bracket sections toward each other to simultaneously maintain said hooks in engagement with said abutments and to clamp said ball between said sockets.

5. In combination, an approximately polygonal plate having parallel edge slots and corner abutments, a flexible clamping band having its ends extended through said slots and provided with fastening means coacting with said plate between the slots, a pair of bracket sections enclosing said band fastening means, each of said sections having a pair of corner hooks at one end interchangeably cooperable with any two of said abutments and also having a socket at its opposite end, an element frictionally cooperable with said sockets, and means for urging said bracket sections toward each other to maintain said hooks in engagement with said abutments and to clamp said element between said sockets.

6. In combination, an approximately square plate having two parallel edge slots and four corner abutments, a flexible clamping band having its opposite ends extended through said slots and provided with adjustable fastening means coacting with said plate midway between said slots, a pair of half-brackets enclosing said fastening means, each of said half-brackets having a pair of corner hooks at one end interchangeably cooperable with any two of said abutments and also having a semi-spherical socket at its opposite end, a spherical element frictionally cooperable with said sockets, and adjustable clamping means cooperable with the medial portions of said half-brackets to retain said hooks in engagement with said abutments and to simultaneously clamp said element between said sockets.

JOEL R. THORP.
HERBERT L. ZIMMERMAN.